United States Patent
Derscheid

(10) Patent No.: US 11,617,307 B2
(45) Date of Patent: Apr. 4, 2023

(54) NET GUIDE FOR UPPER ROLLERS OF ROUND BALER

(71) Applicant: DEERE & COMPANY, Moline, IL (US)

(72) Inventor: Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 89 days.

(21) Appl. No.: 17/304,251

(22) Filed: Jun. 17, 2021

(65) Prior Publication Data

US 2022/0400616 A1 Dec. 22, 2022

(51) Int. Cl.
*A01F 15/18* (2006.01)
*A01F 15/07* (2006.01)

(52) U.S. Cl.
CPC .......... *A01F 15/0715* (2013.01); *A01F 15/18* (2013.01); *A01F 2015/0745* (2013.01); *A01F 2015/0755* (2013.01); *A01F 2015/183* (2013.01)

(58) Field of Classification Search
CPC .................. A01F 15/0715; A01F 15/18; A01F 2015/183; A01F 2015/186; A01F 2015/0745; A01F 2015/0755
See application file for complete search history.

(56) References Cited

U.S. PATENT DOCUMENTS

| | | | | |
|---|---|---|---|---|
| 3,981,391 A | * | 9/1976 | Phillips | A01F 15/07 198/840 |
| 3,992,987 A | * | 11/1976 | Sereg | A01F 15/07 100/88 |
| 4,336,750 A | | 6/1982 | White et al. | |
| 4,386,493 A | * | 6/1983 | Holdeman | A01F 15/0765 56/341 |
| 7,181,900 B2 | * | 2/2007 | Hood | A01F 15/0715 100/88 |
| 11,032,974 B2 | * | 6/2021 | Pilcher | A01F 15/18 |
| 11,109,536 B2 | * | 9/2021 | Goering | A01F 15/0833 |

(Continued)

FOREIGN PATENT DOCUMENTS

| | | |
|---|---|---|
| EP | 2727455 A2 | 5/2014 |
| EP | 3771326 A1 | 2/2021 |

OTHER PUBLICATIONS

Extended European Search Report and Written Opinion issued in European Patent Application No. 22178863.1, dated Nov. 25, 2022, in 11 pages.

*Primary Examiner* — Andrew M Tecco

(57) ABSTRACT

A round baler includes a first roller and a second roller that define a gap therebetween and are arranged to position forming belts immediately adjacent to a baling chamber. A third roller is arranged to position the forming belts radially outward of the baling chamber. The forming belts move along a belt path in sequence from the first roller, to the third roller, and then to the second roller, such that the baling chamber is not bounded by the forming belts in the gap between the first roller and the second roller. A net guide is radially supported by both the first roller and the second roller and laterally positioned between an adjacent pair of the forming belts. The net guide extends across the gap to guide a net material across the gap and prevent the net material from following the forming belts away from the baling chamber.

18 Claims, 9 Drawing Sheets

(56) References Cited

U.S. PATENT DOCUMENTS

| | | | |
|---|---|---|---|
| 2004/0083704 A1* | 5/2004 | Lucand | A01F 15/106 56/341 |
| 2005/0028688 A1* | 2/2005 | Derscheid | A01F 15/07 100/88 |
| 2005/0109007 A1* | 5/2005 | Hood | A01F 15/0715 56/341 |
| 2014/0116272 A1* | 5/2014 | De Craemer | A01F 15/18 100/88 |
| 2018/0242527 A1* | 8/2018 | Pilcher | A01F 15/08 |
| 2019/0045719 A1* | 2/2019 | Goering | A01F 15/18 |

* cited by examiner

NET GUIDE FOR UPPER ROLLERS OF ROUND BALER

TECHNICAL FIELD

The disclosure generally relates to a round baler, and more particularly to a net guide for a round baler.

BACKGROUND

Agricultural baler implements gather, compress, and shape crop material into a bale. There are different types of baler implements that create bales. One type of baler implement is often referred to as a round baler, which includes a baling chamber that produces a bale having a round or cylindrical shape. The round baler includes a wrap system that wraps the round bale with a net material. Once the crop material is formed into the bale, the wrap system introduces the net material into the baling chamber. The wrap material is drawn between the round baler and forming belts encircling and forming the round bale, whereby the net material is wrapped around an outer circumference of the round bale to secure the shape of the bale.

The forming belts may be wound around the rollers to follow a belt path that forms the baling chamber. The belt path may include one or more sections in which the forming belts do not directly span a gap between adjacent rollers forming and/or defining the cylindrical shape of the baling chamber. In these sections, the net material may follow the forming belts through the gap not covered by the forming belts and away from the outer circumference of the bale, causing the net material to become tangled.

SUMMARY

A round baler is provided. The round baler includes a frame that extends along a central longitudinal axis between a forward end and a rearward end. The round baler further includes a plurality of rollers and a plurality of forming belts. Each of the rollers is rotatably supported by the frame for rotation about a respective roller axis. Each of the forming belts is guided by the plurality of rollers, and is moveable in an endless loop relative to the plurality of rollers along a belt path. The plurality of forming belts is arranged to define a baling chamber. The baling chamber is operable to form crop into a bale having a cylindrical shape, and to include an inlet for supplying the crop into the baling chamber. A wrap system is operable to supply a net material to the inlet of the baling chamber. The net material is drawn between the bale and the plurality of forming belts and around a circumferential surface of the bale. The plurality of rollers includes a first roller, a second roller, and a third roller. The first roller and the second roller define a gap therebetween and are arranged to position the plurality of forming belts immediately adjacent to the baling chamber. The third roller is arranged to position the plurality of forming belts radially outward of the baling chamber. The plurality of forming belts move along the belt path in sequence from the first roller, to the third roller, and then to the second roller, such that the baling chamber is not bounded by the plurality of forming belts in the gap between the first roller and the second roller. A net guide is radially supported by both the first roller and the second roller and laterally positioned between an adjacent pair of the plurality of forming belts. The net guide extends across the gap to guide the net material across the gap and prevent the net material from following the plurality of forming belts through the gap and around the third roller.

In one aspect of the disclosure, the net guide is moveable relative to each of the first roller and the second roller axially along the respective roller axis of the first roller and the second roller. As such, the net guide does not align or guide the forming belts, but rather the net guide may move laterally on the rollers with the forming belts.

In one aspect of the disclosure, the net guide may include and/or be manufactured from a low friction material. For example, the net guide may include and/or be manufactured from a low friction polymer material. In one implementation, the low friction material may be positioned on a contact edge surface of the net guide that engages the net material.

In one aspect of the disclosure, each of the first roller and the second roller are rotatable relative to the net guide about their respective roller axis. As such, the first roller and the second roller are both free to rotate relative to the net guide at the same or different rotational speeds.

In one aspect of the disclosure, the net guide encircles each of the first roller and the second roller. In one implementation, the net guide may include a planar structure. The planar structure defines a first aperture that is sized to receive the first roller therethrough, and a second aperture that is sized to receive the second roller therethrough.

In one implementation of the disclosure, the net guide may include a first ring portion and a second ring portion extending away from a central base portion. The first ring portion may include a first half and a second half forming the first aperture for receiving the first roller therethrough. The first ring portion may include a split ring having a first connection attaching a respective distal end of each of the first half and the second half of the first ring portion together. The second ring portion may include a first half and a second half forming the second aperture for receiving the second roller therethrough. The second ring portion may include a split ring having a second connection attaching a respective distal end of each of the first half and the second half of the second ring portion together. By incorporating the split ring configuration, the net guide may be positioned over the first roller and the second roller from around the circumference of each respective, such that the net guide does not have to be slid over an axial end of each of the first roller and the second roller In one aspect of the disclosure, the net guide includes a contact edge surface that is positioned to engage the net material, and an opposing radially outer edge surface. The radially outer edge surface of the net guide may be formed to include a concave shape for nesting a circumference of the third roller therein.

In one implementation, the net guide may include an endless belt that is wrapped around the first roller and the second roller. The endless belt may include a low friction, elastomeric material.

A net guide for guiding net material across a gap between a first roller and a second roller of a round baler is also provided. The net guide includes a plate having a central base portion, a first ring portion, and a second ring portion. The first ring portion defines a first aperture sized for receiving the first roller therethrough. The second ring portion defines a second aperture sized for receiving the second roller therethrough.

In one aspect of the disclosure, the first ring portion is a split ring having a first half and a second half extending from the central base portion to respective distal ends, and cooperating to define the first aperture. The first ring portion may include a first connection attaching the respective distal ends of the first half and the second half of the first ring portion together. In one aspect of the disclosure, the second ring portion is a split ring having a first half and a second half extending from the central base portion to respective distal ends, and cooperating to define the second aperture. The second ring portion may include a second connection attaching the respective distal ends of the first half and the second half of the second ring portion together.

In one aspect of the disclosure, the first aperture defines a diameter that is sized larger than an exterior diameter of the first roller. The second aperture includes a diameter that is sized larger than an exterior diameter of the second roller. By so doing, the first roller may freely rotate within the first aperture relative to the net guide, and the second roller may freely rotate within the second aperture relative to the net guide.

In one aspect of the disclosure, the plate includes a contact edge surface that is positioned to engage the net material, and an opposing radially outer edge surface. The contact edge surface may include and/or be manufactured from a low friction material. The radially outer edge surface of the plate may be shaped to form a concave shape for nesting a circumference of a third roller therein.

Accordingly, the net guide described herein guides the net material across the gap between the first roller and the second roller, where the forming belts do not bound the baling chamber. By so doing, the net material is prevented or blocked from following the forming belts out of the baling chamber toward the third roller. The net guide moves laterally with the forming belts on the first roller and the second roller, thereby preventing or limiting wear and abrasion between the forming belts and the net guide.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
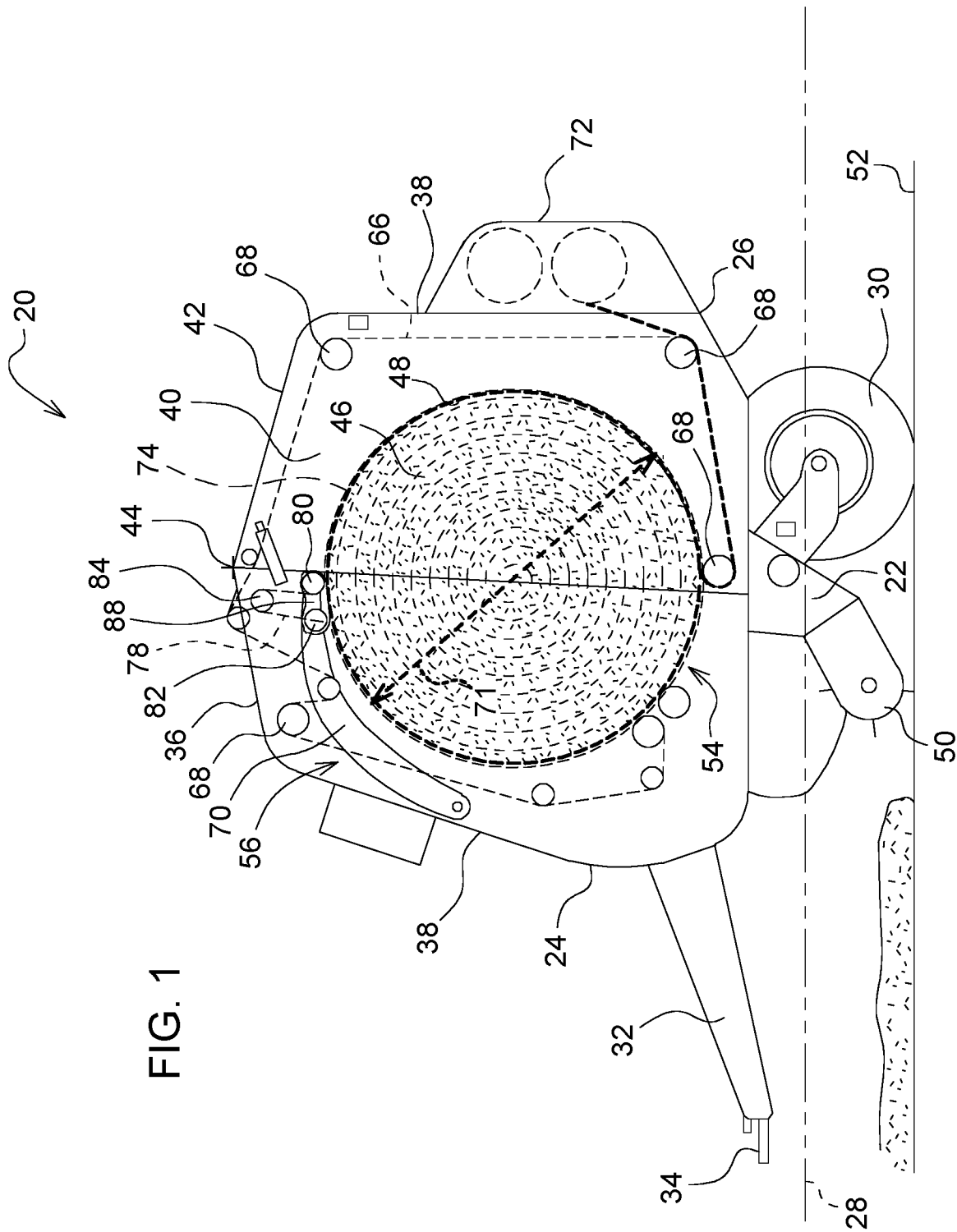
FIG. 1 is a schematic side view of a round baler showing a gate in a closed position.
Figure 2:
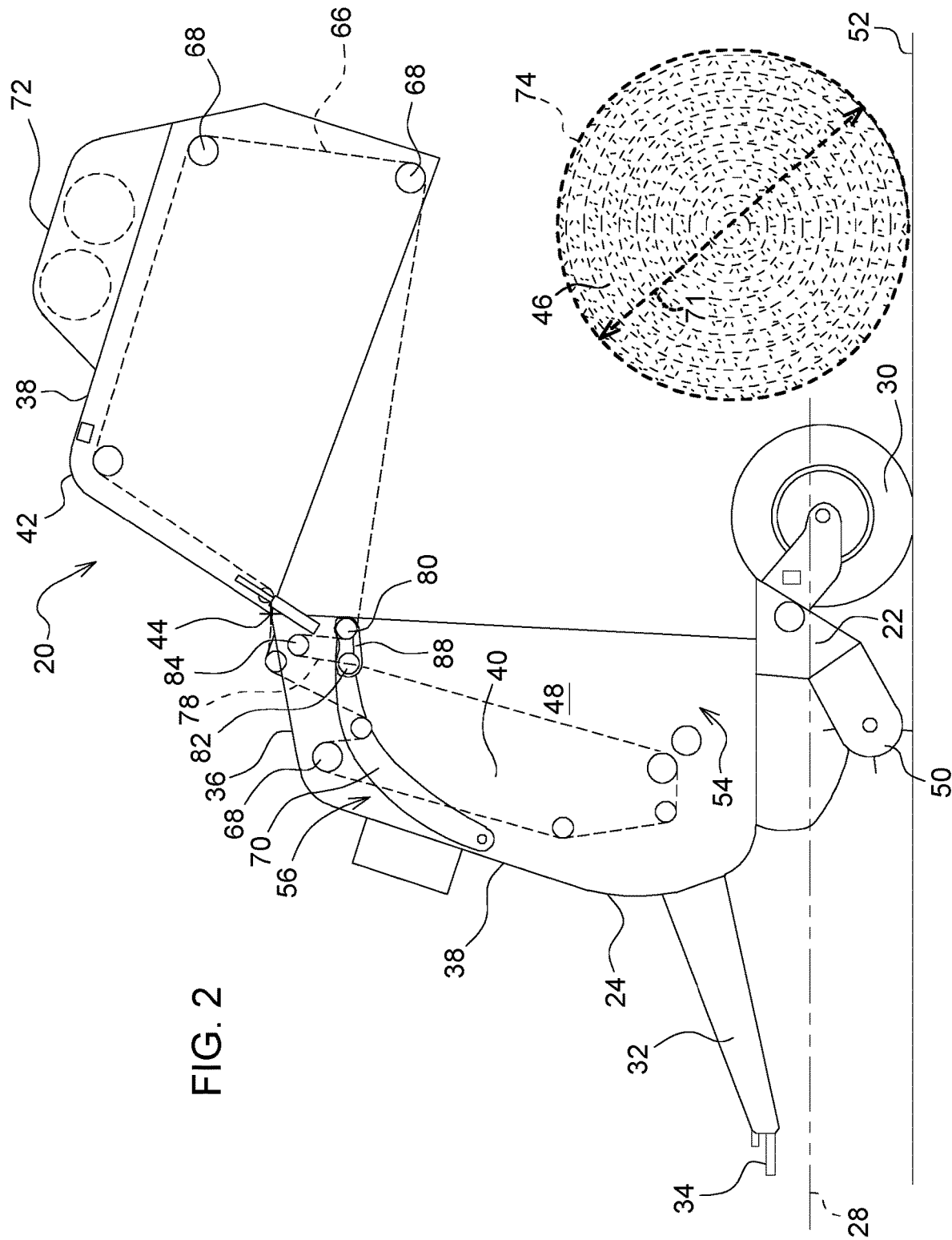
FIG. 2 is a schematic side view of the round baler showing the gate in an open position.

Referring to the Figures, wherein like numerals indicate like parts throughout the several views, a round baler is generally shown at 20. Referring to FIGS. 1-2, the round baler 20 includes a frame 22. The frame 22 extends between a forward end 24 and a rearward end 26 along a central longitudinal axis 28 of the frame 22. One or more ground engaging elements 30, such as but not limited to one or more wheels and/or tracks, are attached to and rotatably supported by the frame 22. A tongue 32 may be coupled to the frame 22 at the forward end 24 of the frame 22. A hitch arrangement 34 may be included with the tongue 32. The hitch arrangement 34 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a housing 36. The housing 36 is attached to and supported by the frame 22. The housing 36 may include one or more walls 38 or panels that at least partially enclose and/or define an interior region 40. The round baler 20 may further include a gate 42. The gate 42 may include one or more walls 38 or panels that at least partially enclose and/or define the interior region 40. As such, the housing 36 and the gate 42 cooperate to define the interior region 40 therebetween.

The gate 42 is attached to and rotatably supported by the housing 36 adjacent the rearward end 26 of the frame 22. The gate 42 is pivotably moveable about a gate rotation axis 44. The gate rotation axis 44 is generally horizontal and perpendicular to the central longitudinal axis 28 of the frame 22. The gate 42 is moveable between a closed position (shown in FIG. 1) for forming a bale 46 within a baling chamber 48 within the interior region 40, and an open position (shown in FIG. 2) for discharging the bale 46 from the baling chamber 48.

The round baler 20 includes a pick-up 50 disposed proximate the forward end 24 of the frame 22. The pickup gathers crop material from a ground surface 52 and directs the gathered crop material toward and into an inlet 54 of the baling chamber 48. The pickup may include, but is not limited to tines, forks, augers, conveyors, baffles, etc., for gathering and moving the crop material. The round baler 20 may be equipped with a pre-cutter (not shown), disposed between the pickup and the inlet 54. As such, the pre-cutter is disposed downstream of the pickup and upstream of the inlet 54 relative to a direction of travel of the crop material through the round baler 20. As is understood by those skilled in the art, the pre-cutter cuts or chops the crop material into smaller pieces.

Figure 3:
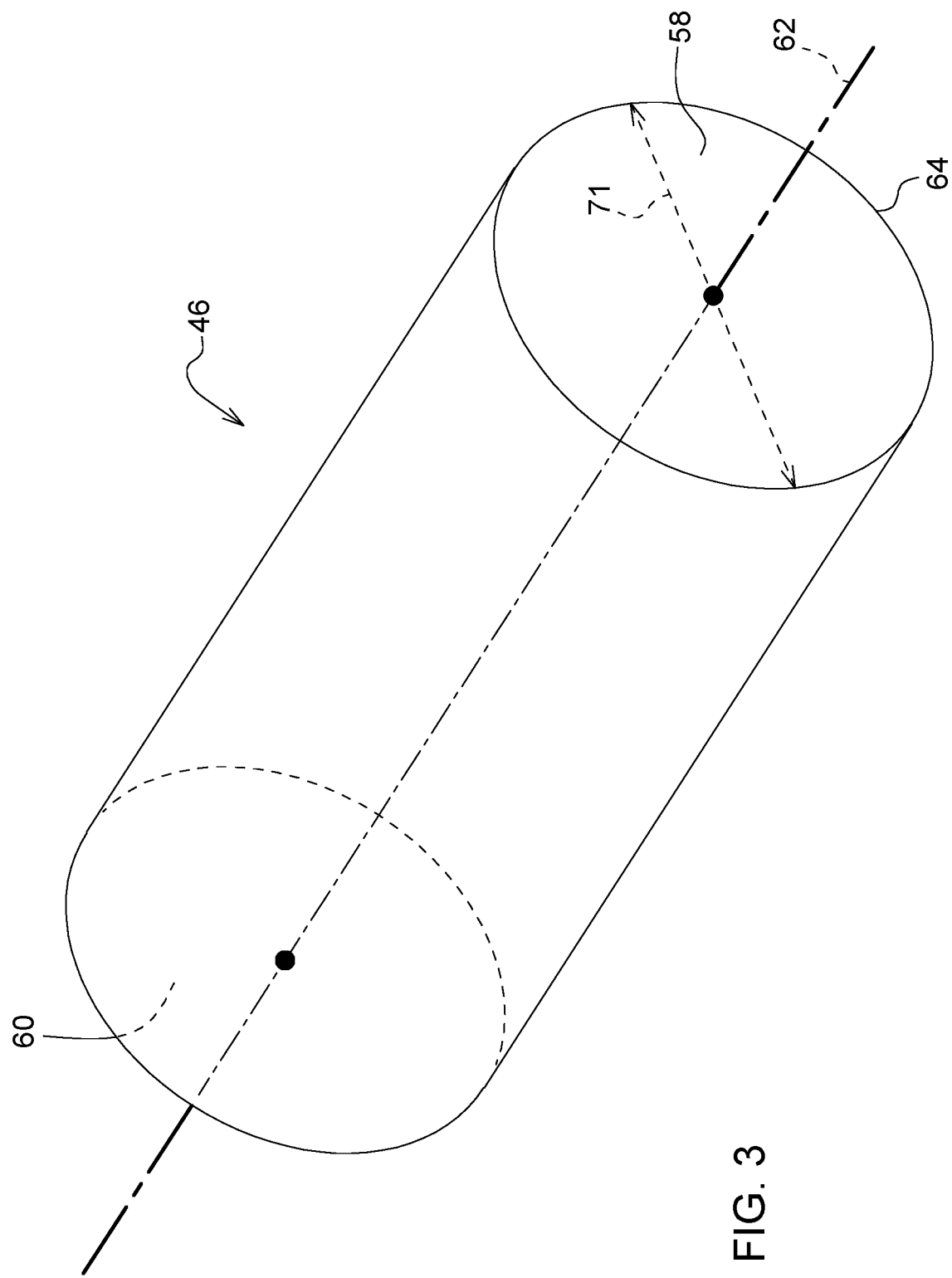
FIG. 3 is a schematic perspective view of a bale.

A bale formation system 56 is disposed within the interior region 40 and defines the baling chamber 48. In the example implementation shown in the Figures and described herein, the bale formation system 56 is operable to form the bale 46 to have a cylindrical shape. Referring to FIG. 3, the cylindrical shape of the bale 46 includes a first circular end face 58 and a second circular end face 60 disposed at opposing ends of the bale 46 relative to a centerline 62 of the cylindrical shape. The centerline 62 of the bale 46 is generally located and extends through respective diametric centers of the first circular end face 58 and the second circular end face 60. The centerline 62 of the cylindrical shape is generally parallel with the gate rotation axis 44 during formation of the bale 46 by the bale formation system 56, within the baling chamber 48. The bale 46 includes a circumferential surface 64 that extends between the first circular end face 58 and the second circular end face 60. The circumferential surface 64 is concentric with the centerline 62 of the cylindrical shape, and wraps around a circumference of the bale 46.

The bale formation system 56 may be configured as a variable chamber system, or a fixed chamber system. The round baler 20 shown in the Figures and described herein is depicted and described as a variable chamber baler. Referring to FIGS. 1-2, and as is understood by those skilled in the art, the variable chamber baler includes a plurality of longitudinally extending side-by-side forming belts 66 that are supported by a plurality of rollers 68. The bale 46 is formed by the forming belts 66 and one or more walls 38 of the housing 36 and gate 42. As is understood by those skilled in the art, the forming belts 66 are controlled to vary the radial size of the baling chamber 48. The specific components and operation of the bale formation system 56, other than specifically described herein, are known to those skilled in the art, are not pertinent to the teachings of this disclosure, and are therefore not described in detail herein.

In the example implementation shown in the figures and described herein, in which the bale formation system 56 includes the variable chamber baler, the crop material is directed through the inlet 54 and into the baling chamber 48, whereby the forming belts 66 roll the crop material in a spiral fashion into the bale 46 having the cylindrical shape. The forming belts 66 apply a constant pressure to the crop material as the crop material is formed into the bale 46. A belt tensioner 70 continuously moves the forming belts 66 radially outward relative to the centerline 62 of the cylindrical bale 46 as a diameter 71 of the bale 46 increases. The belt tensioner 70 maintains the appropriate tension in the belts to obtain the desired density of the crop material.

As shown in FIGS. 1-2, the round baler 20 includes a wrap system 72. The wrap system 72 is operable to wrap the bale 46 with a net material 74 inside the baling chamber 48. Once the bale 46 is formed to a desired size, the wrap system 72 supplies the net material 74 to the inlet 54 of the baling chamber 48 and feeds the net material 74 into the baling chamber 48. The net material 74 is drawn between the bale 46 and the forming belts 66, whereby friction between the bale 46 and the forming belts 66 moves the net material 74 with the bale 46 and the forming belts 66 and wraps the net material 74 around the circumferential surface 64 of the bale 46 as the bale 46 rotates within the baling chamber 48. The net material 74 wraps the bale 46 thereby securing the crop material in a tight package and maintaining the desired shape of the bale 46. The net material 74 may include, but is not limited to, a twine, a net mesh, or a solid plastic wrap. Movement of the gate 42 into the open position simultaneously moves the forming belts 66 clear of the formed bale 46 and allows the formed and wrapped bale 46 to be discharged through the rear of the baling chamber 48.

As described above, the round baler 20 includes the plurality of rollers 68 that support the plurality of forming belts 66. Each of the rollers 68 is rotatably supported by the frame 22 for rotation about a respective roller axis 76. Each of the forming belts 66 is supported and guided by the rollers 68. Additionally, each of the forming belts 66 is moveable in an endless loop relative to the plurality of rollers 68 along a belt path 78. The belt path 78 is the circuitous route the forming belts 66 follow around the rollers 68. The forming belts 66 are arranged to define the baling chamber 48 for forming crop into the bale 46. The baling chamber 48 includes a substantially cylindrical shape for forming the bale 46, and includes the inlet 54 for supplying the crop into the baling chamber 48.

Figure 4:
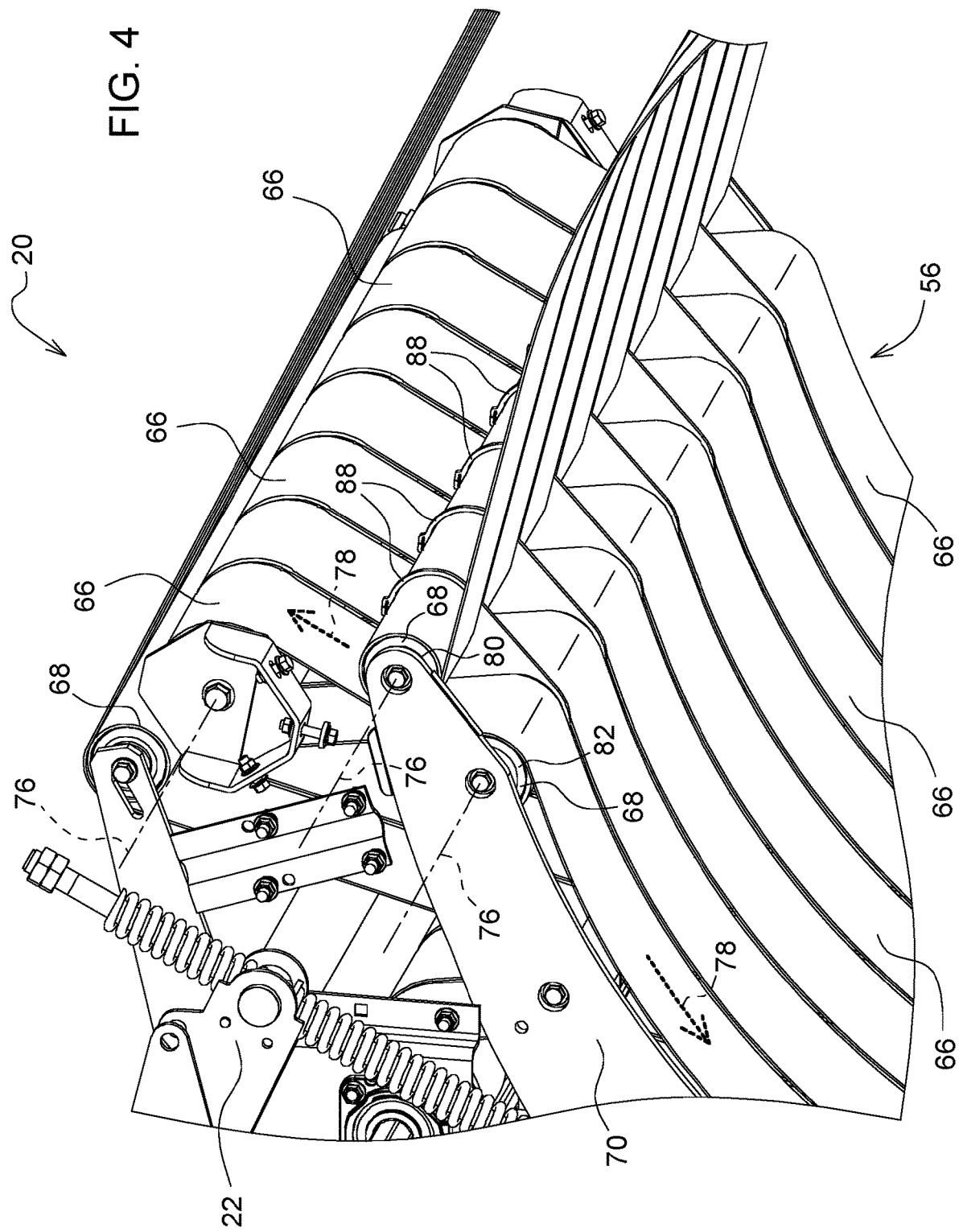
FIG. 4 is a schematic partial perspective view of the round baler showing a net guide.
Figure 5:
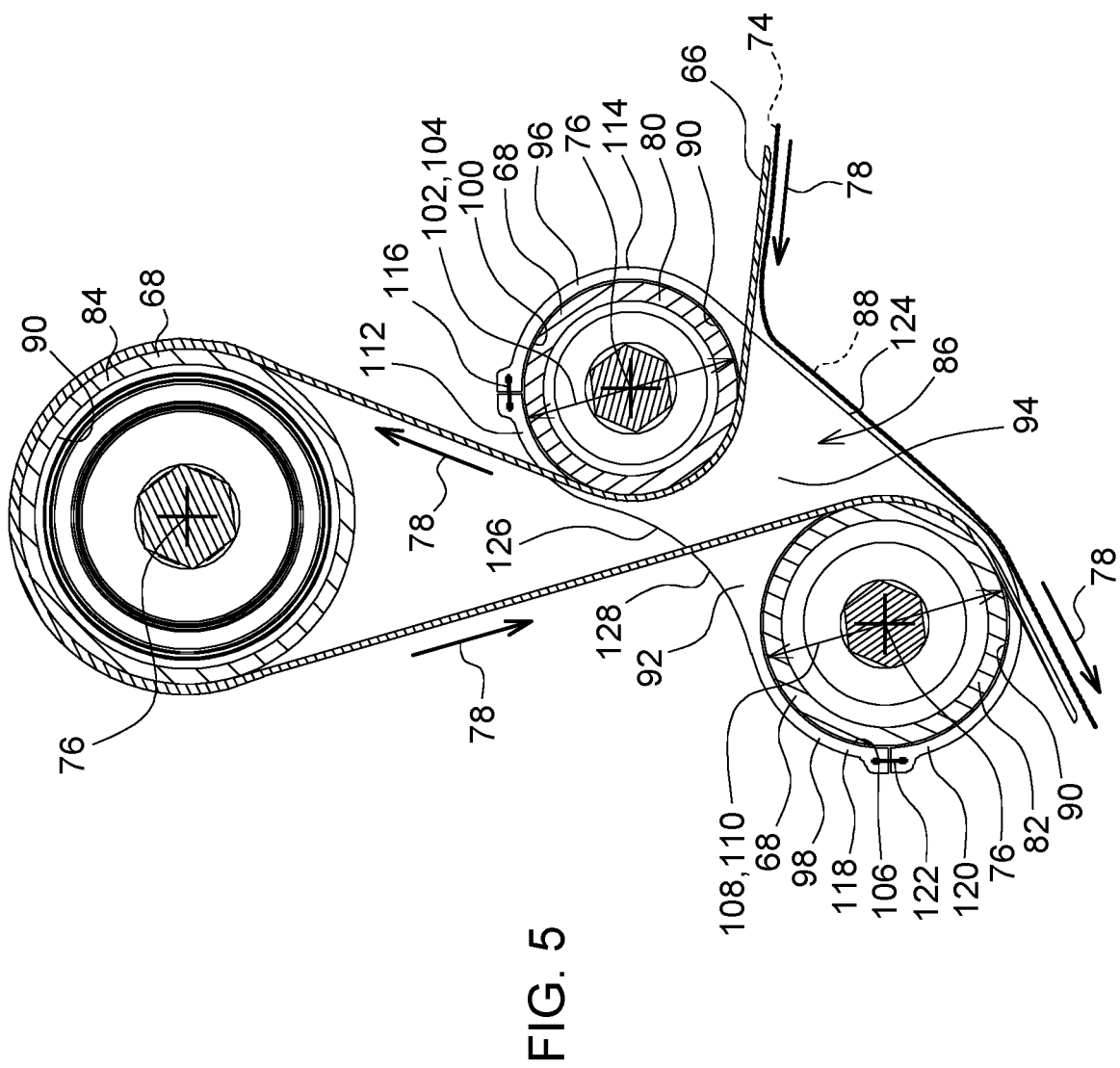
FIG. 5 is a schematic cross sectional side view of the round baler showing the net guide.
Figure 6:
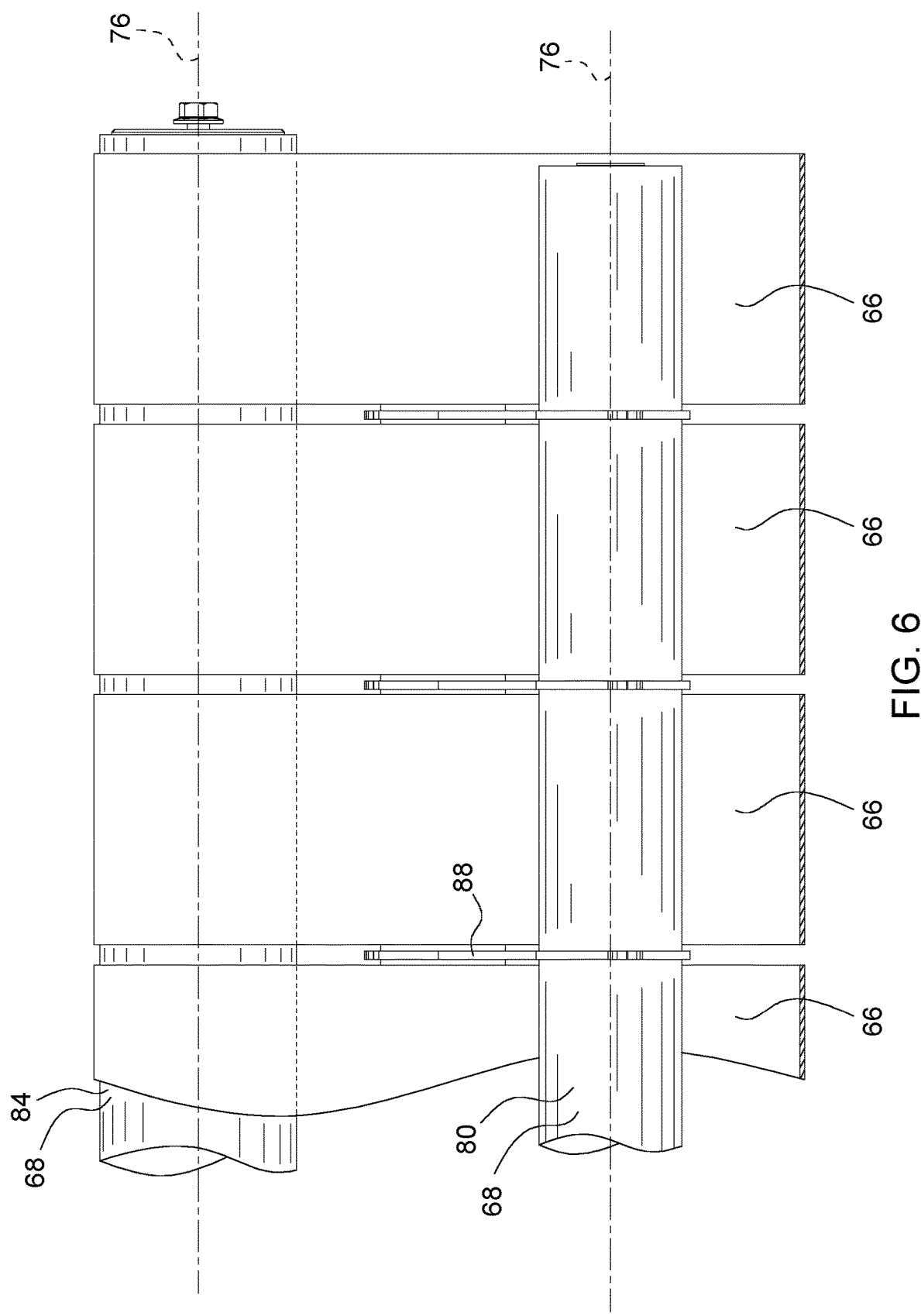
FIG. 6 is a schematic end view of the round baler showing the net guide.
Figure 7:
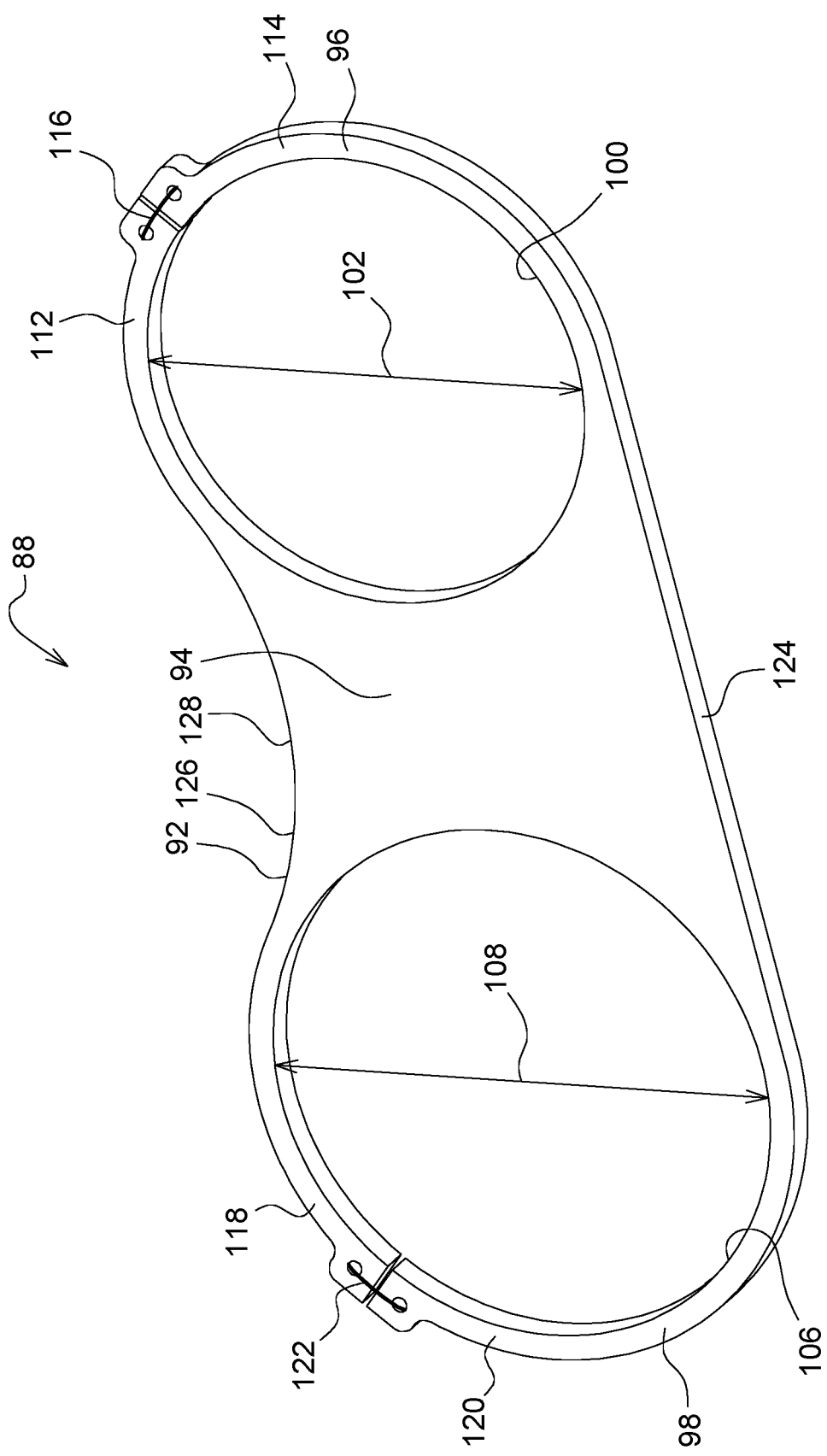
FIG. 7 is a schematic perspective view of the net guide.

Referring to FIGS. 4-6, the plurality of rollers 68 includes a first roller 80, a second roller 82, and a third roller 84. The first roller 80 and the second roller 82 define a gap 86 therebetween and are arranged to position the plurality of forming belts 66 immediately adjacent to the baling chamber 48. As such, both the first roller 80 and the second roller 82 are positioned on the circumferential surface 64 of the baling chamber 48 to position and directly press the forming belts 66 against the bale 46. The third roller 84 is arranged to position the plurality of forming belts 66 radially outward of the baling chamber 48. As such, the third roller 84 does not directly press the forming belts 66 against the bale 46, and is generally spaced radially outward from the first roller 80 and the second roller 82 relative to the centerline 62 of the bale 46.

As described above, the forming belts 66 move along the belt path 78 in a continuous manner, i.e., in an endless loop. When moving along the belt path 78, the forming belts 66 move in sequence from the first roller 80, to the third roller 84, and then to the second roller 82. Because of this arrangement, the baling chamber 48 is not bounded by the forming belts 66 in the gap 86 between the first roller 80 and the second roller 82. In other words, the forming belts 66 to not directly extend across the gap 86 between the first roller 80 and the second roller 82, but instead are routed around the third roller 84, which is radially spaced outward of the baling chamber 48.

The round baler 20 includes a net guide 88 for guiding net material 74 across a gap 86 between the first roller 80 and the second roller 82. The net guide 88 is radially supported by both the first roller 80 and the second roller 82 and laterally positioned between an adjacent pair of the plurality of forming belts 66. It should be appreciated that the round baler 20 may include multiple net guide 88s, with one net guide 88 positioned between each adjacent pair of the forming belts 66. The net guide 88 extends across the gap 86 between the first roller 80 and the second roller 82 to guide the net material 74 across the gap 86 and prevent the net material 74 from following the plurality of forming belts 66 through the gap 86, out of the baling chamber 48, and around the third roller 84.

The net guide 88 encircles each of the first roller 80 and the second roller 82. In other words, each of the first roller 80 and the second roller 82 have a cylindrical shape defining an exterior cylindrical surface 90, with the net guide 88 positioned around the exterior cylindrical surface 90 of the first roller 80 and the second roller 82 respectively. By so doing, each of the first roller 80 and the second roller 82 are independently rotatable relative to the net guide 88.

Referring to FIGS. 4-7, a first implementation of the net guide 88 is shown. The net guide 88 of FIGS. 4-7 includes a plate 92 having a planar structure. The plate 92 includes a central base portion 94, a first ring portion 96, and a second ring portion 98. The first ring portion 96 defines a first aperture 100 sized to receive the first roller 80 therethrough. The first aperture 100 defines a diameter 102 sized larger than an exterior diameter 104 of the exterior cylindrical surface 90 of the first roller 80. The first roller 80 is rotatable relative to the net guide 88 about its' respective roller axis 76. The second ring portion 98 defines a second aperture 106 sized to receive the second roller 82 therethrough. The second aperture 106 includes a diameter 108 sized larger than an exterior diameter 110 of the exterior cylindrical surface 90 of the second roller 82. The second roller 82 is rotatable relative to the net guide 88 about its' respective roller axis 76.

In the example implementation shown in the Figures and described herein, the first ring portion 96 is a split ring having a first half 112 and a second half 114 extending from the central base portion 94 to respective distal ends. The first half 112 and the second half 114 of the first ring portion 96 cooperate to define the first aperture 100. The first ring portion 96 may include a first connection 116 attaching the respective distal ends of the first half 112 and the second half 114 of the first ring portion 96 together. The first connection 116 may include, but is not limited to, a bolted connection, a clamped connection a clasp, a latch, a wire, a zip tie, a roller chain connecting link, etc. The split ring of the first ring portion 96 allows the first ring portion 96 to be installed around an outer circumference of the first roller 80, such that the first ring portion 96 does not need to be installed from an axial end of the first roller 80.

In the example implementation shown in the Figures and described herein, the second ring portion 98 is a split ring having a first half 118 and a second half 120 extending from the central base portion 94 to respective distal ends. The first half 118 and the second half 120 of the second ring portion 98 cooperate to define the second aperture 106. The second ring portion 98 may include a second connection 122 attaching the respective distal ends of the first half 118 and the second half 120 of the second ring portion 98 together. The second connection 122 may include, but is not limited to, a bolted connection, a clamped connection a clasp, a latch, etc. The split ring of the second ring portion 98 allows the second ring portion 98 to be installed around an outer circumference of the second roller 82, such that the second ring portion 98 does not need to be installed from an axial end of the second roller 82.

The net guide 88 is slidably moveable relative to each of the first roller 80, the second roller 82 axially along the respective roller axis 76 of the first roller 80 and the second roller 82. Accordingly, the net guide 88 is free to slide along the first roller 80 and the second roller 82, in a lateral direction relative to the running or rotating direction of the forming belts 66. In so doing, the net guide 88 is laterally moveable with the forming belts 66 on the first roller 80 and the second roller 82, thereby reducing friction and/or wear of the edges of the forming belts 66. Notably, because the net guide 88 is freely moveable in the lateral direction on the first roller 80 and the second roller 82, the net guide 88 does not provide guidance to the forming belts 66, i.e., the net guide 88 is configured to guide the net material 74 across the gap 86 between the first roller 80 and the second roller 82 without biasing the forming belts 66 in the lateral direction.

The plate 92 of the net guide 88 includes a contact edge surface 124 that is positioned to engage the net material 74. The contact edge surface 124 may include and/or be manufactured from a low friction material, such as but not limited to a polymer material or a polished metal material, so that the net material 74 glides across the contact edge surface 124 of the net guide 88. The net guide 88 may be manufactured from a low friction polymer material, or may be manufactured from some other material, such as a metal, and include a low friction polymer material attached to the plate 92 to form the contact edge surface 124. In other implementations, the contact edge surface 124 of the plate 92 may be processed to provide a low friction surface, such as a polished metal surface or the like.

As noted above, the plate 92 of the net guide 88 includes the contact edge surface 124. Additionally, the plate 92 may include a radially outer edge surface 126 disposed opposite the contact edge surface 124. The radially outer edge surface 126 of the plate 92 is positioned to face the third roller 84. The radially outer edge surface 126 of the plate 92 may be shaped to form a concave shape 128 perpendicular to the rotational axis of the third roller 84 and/or along the central longitudinal axis 28 of the frame 22. The concave shape 128 of the radially outer edge surface 126 allows for the third roller 84 to nest tightly within the concave shape 128, thereby providing a compact arrangement between the first roller 80, the second roller 82, and the third roller 84.

Figure 8:
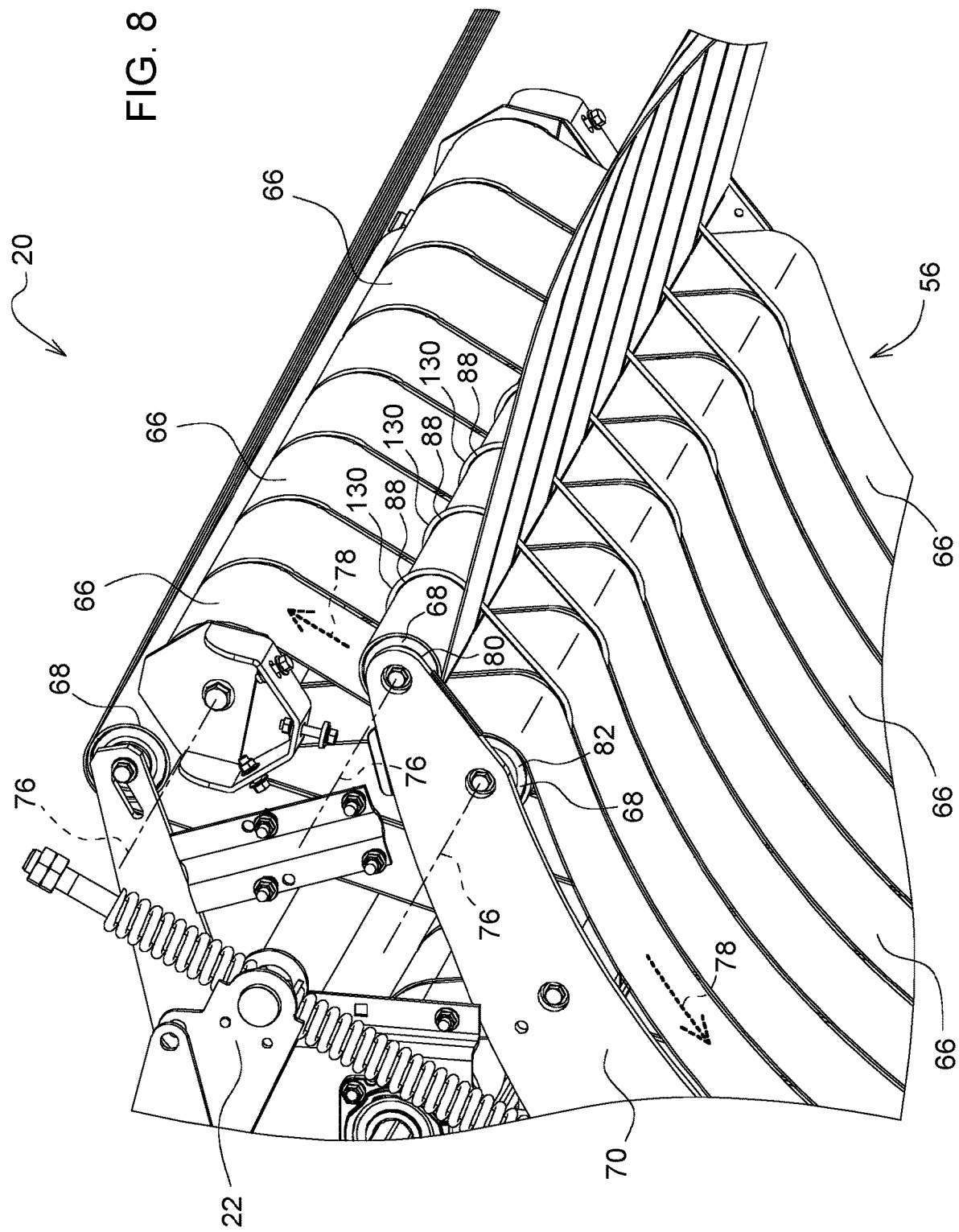
FIG. 8 is a schematic partial perspective view of the round baler showing an alternative embodiment of the net guide.
Figure 9:
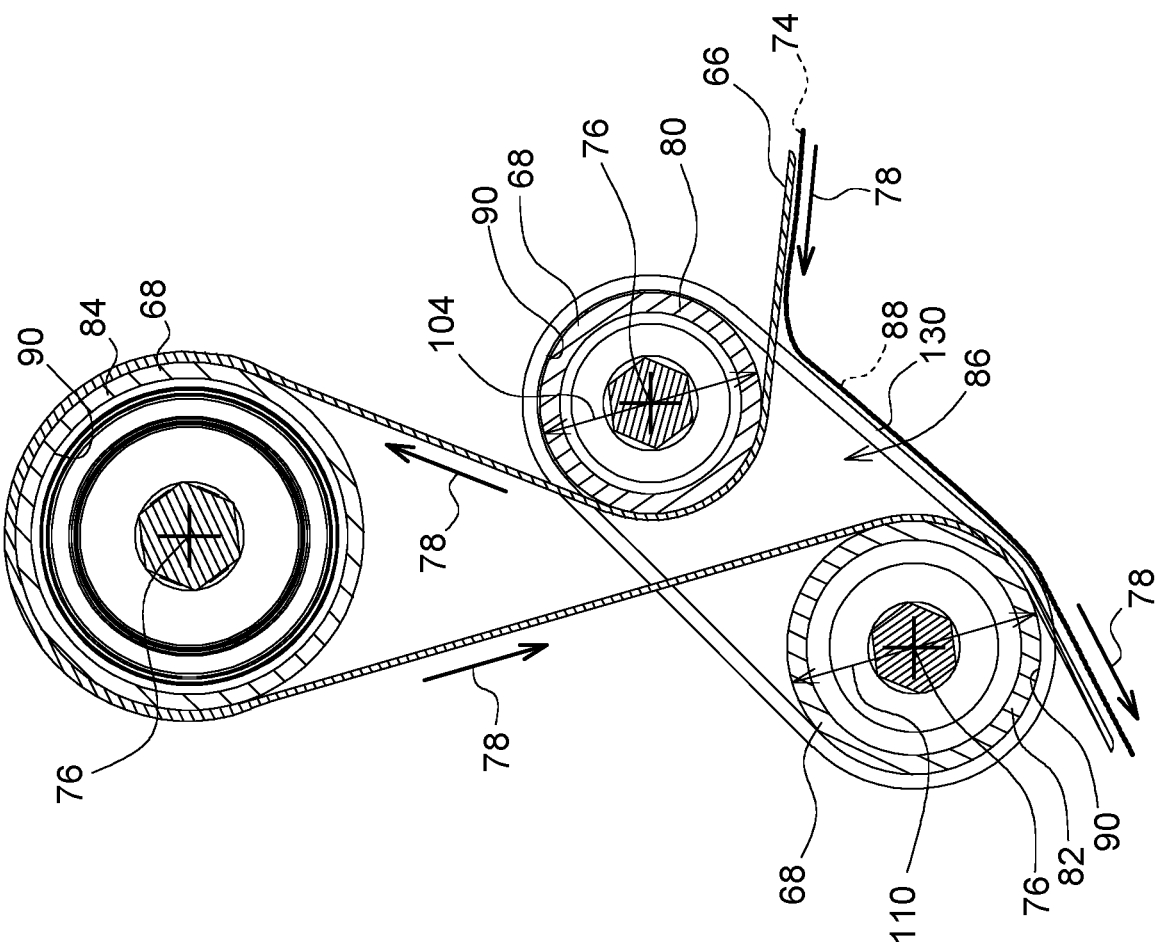
FIG. 9 is a schematic cross sectional side view of the round baler showing the alternative embodiment of the net guide.

Referring to FIGS. 8-9, an alternative implementation of the net guide is generally shown at 88A. The alternative implementation of the net guide 88A is configured as an endless belt 130 wrapped around the first roller 80 and the second roller 82. The endless belt 130 may be manufactured from and/or include an elastomeric material. As used herein, and elastomeric material should be understood to include a material capable of automatically returning to a pre-deformed shape after deformation.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A round baler comprising:
  a frame extending along a central longitudinal axis between a forward end and a rearward end;
  a plurality of rollers, with each of the plurality of rollers rotatably supported by the frame for rotation about a respective roller axis;
  a plurality of forming belts, with each of the plurality of forming belts guided by the plurality of rollers and moveable in an endless loop relative to the plurality of rollers along a belt path;

wherein the plurality of forming belts is arranged to define a baling chamber for forming crop into a bale having a cylindrical shape, and an inlet for supplying the crop into the baling chamber;

a wrap system operable to supply a net material to the inlet of the baling chamber, whereby the net material is drawn between the bale and the plurality of forming belts and around a circumferential surface of the bale;

wherein the plurality of rollers includes a first roller, a second roller, and a third roller, wherein the first roller and the second roller define a gap therebetween and are arranged to position the plurality of forming belts immediately adjacent to the baling chamber, and wherein the third roller is arranged to position the plurality of forming belts radially outward of the baling chamber;

wherein the plurality of forming belts move along the belt path in sequence from the first roller, to the third roller, and then to the second roller, such that the baling chamber is not bounded by the plurality of forming belts in the gap between the first roller and the second roller;

a net guide radially supported by both the first roller and the second roller and laterally positioned between an adjacent pair of the plurality of forming belts, wherein the net guide extends across the gap to guide the net material across the gap and prevent the net material from following the plurality of forming belts through the gap and around the third roller, wherein the net guide is moveable relative to each of the first roller and the second roller axially along the respective roller axis of the first roller and the second roller.

2. The round baler set forth in claim 1, wherein the net guide includes a polymer material.

3. The round baler set forth in claim 1, wherein each of the first roller and the second roller are rotatable relative to the net guide about their respective roller axis.

4. The round baler set forth in claim 1, wherein the net guide encircles each of the first roller and the second roller.

5. The round baler set forth in claim 4, wherein the net guide includes a planar structure defining a first aperture sized to receive the first roller therethrough, and a second aperture sized to receive the second roller therethrough.

6. The round baler set forth in claim 4, wherein the net guide includes a first ring portion having a first half and a second half forming a first aperture for receiving the first roller therethrough.

7. The round baler set forth in claim 6, wherein the first ring portion is a split ring having a first connection attaching a respective distal end of each of the first half and the second half of the first ring portion together.

8. The round baler set forth in claim 6, wherein the net guide includes a second ring portion having a first half and a second half forming a second aperture for receiving the second roller therethrough.

9. The round baler set forth in claim 8, wherein the second ring portion is a split ring having a second connection attaching a respective distal end of each of the first half and the second half of the second ring portion together.

10. The round baler set forth in claim 4, wherein the net guide includes an endless belt wrapped around the first roller and the second roller.

11. The round baler set forth in claim 10, wherein the endless belt includes an elastomeric material.

12. The round baler set forth in claim 1, wherein the net guide includes a contact edge surface positioned to engage the net material, and an opposing radially outer edge surface, with the radially outer edge surface of the net guide forming a concave shape for nesting the third roller therein.

13. A net guide that guides a net material across a gap between a first roller and a second roller of a round baler, the net guide comprising:

a plate having a central base portion, a first ring portion, and a second ring portion;

wherein the first ring portion defines a first aperture sized for receiving the first roller therethrough; and wherein the second ring portion defines a second aperture sized for receiving the second roller therethrough;

wherein the first aperture defines a diameter sized larger than an exterior diameter of the first roller, and wherein the second aperture includes a diameter sized larger than an exterior diameter of the second roller.

14. The net guide set forth in claim 13, wherein the first ring position is a split ring having a first half and a second half extending from the central base portion to respective distal ends, and cooperating to define the first aperture.

15. The net guide set forth in claim 14, wherein the first ring portion includes a first connection attaching the respective distal ends of the first half and the second half of the first ring portion together.

16. The net guide set forth in claim 13, wherein the second ring portion is a split ring having a first half and a second half extending from the central base portion to respective distal ends, and cooperating to define the second aperture.

17. The net guide set forth in claim 16, wherein the second ring portion includes a second connection attaching the respective distal ends of the first half and the second half of the second ring portion together.

18. The net guide set forth in claim 13, wherein the plate includes a contact edge surface positioned to engage the net material, and an opposing radially outer edge surface, with the radially outer edge surface of the plate forming a concave shape for nesting a third roller therein.

* * * * *